(12) United States Patent
Jang

(10) Patent No.: US 8,053,690 B2
(45) Date of Patent: Nov. 8, 2011

(54) AUTOMOTIVE BRAKE LIGHT SWITCH

(75) Inventor: Jae Ho Jang, Daegu (KR)

(73) Assignee: Hyundai Motor Company, Seoul (KR)

( * ) Notice: Subject to any disclaimer, the term of this patent is extended or adjusted under 35 U.S.C. 154(b) by 402 days.

(21) Appl. No.: 12/463,955

(22) Filed: May 11, 2009

(65) Prior Publication Data
US 2010/0140063 A1    Jun. 10, 2010

(51) Int. Cl.
*H01H 3/14* (2006.01)

(52) U.S. Cl. .......... 200/61.89; 200/83 J; 200/83 Q; 303/114.3; 91/376 R

(58) Field of Classification Search .......... 200/61.89, 200/83 R, 83 Q, 83 P, 83 S, 83 SA, 286, 287, 200/331; 303/113.3, 114.3, 115.1, 115.2; 91/367 R, 391 R
See application file for complete search history.

(56) References Cited

U.S. PATENT DOCUMENTS

| | | | |
|---|---|---|---|
| 4,220,836 A * | 9/1980 | Hersey ................. | 200/83 P |
| 4,297,550 A * | 10/1981 | Leighton ............... | 200/61.89 |
| 4,626,636 A * | 12/1986 | Hickman et al. ...... | 200/83 P |
| 5,141,295 A * | 8/1992 | Burgdorf et al. ...... | 303/113.3 |
| 5,207,770 A * | 5/1993 | Fecher ................. | 91/369.4 |
| 5,992,947 A * | 11/1999 | Tsubouchi ............ | 303/114.3 |
| 2010/0024637 A1 * | 2/2010 | Jang .................... | 91/369.1 |

FOREIGN PATENT DOCUMENTS

| | | |
|---|---|---|
| JP | 60-206765 A | 10/1985 |
| JP | 05-077714 A | 3/1993 |
| JP | 2003-104188 A | 4/2003 |
| KR | 20-0227704 Y1 | 10/2001 |
| KR | 10-0329527 B1 | 10/2002 |
| KR | 10-0486662 B1 | 5/2005 |
| KR | 10-0867719 B1 | 11/2008 |

* cited by examiner

*Primary Examiner* — Xuong Chung Trans
(74) *Attorney, Agent, or Firm* — Morgan, Lewis & Bockius LLP

(57) ABSTRACT

An automotive brake light switch mounted on a brake booster includes a housing defining a constant pressure chamber and a variable pressure chamber partitioned by a diaphragm, with a first through-hole of the housing, a second through-hole formed in the diaphragm and an air intake valve to allow the constant pressure chamber to selectively communicate with the variable pressure chamber, wherein the air intake valve is fitted into the second through-hole and configured to selectively open or close the first through-hole in response to a brake pedal, the brake light switch apparatus having a switch body, a switch rod slidably mounted to the switch body so as to turn on/off a switch of the switch body, wherein a protruding length of the switch rod is changeable by the air intake valve, and a coupling portion coupling the switch body to the housing through the first through-hole.

15 Claims, 10 Drawing Sheets

AUTOMOTIVE BRAKE LIGHT SWITCH

CROSS-REFERENCE TO RELATED APPLICATIONS

The present invention claims priority to Korean Patent Application Number 2008-0122869 filed on Dec. 5, 2008, the entire contents of which application is incorporated herein for all purposes by this reference.

BACKGROUND OF THE INVENTION

1. Field of the Invention

The present invention relates to a brake light switch for a vehicle and, more particularly, to an automotive brake light switch mounted on a brake booster, in which the operation of a switch rod of the brake light switch is controlled by an air intake valve such that the switch rod protrudes by a constant length.

2. Description of Related Art

As is well known in the art, a variety of lights such as back up lights, which are illuminated when a transmission is placed in reverse, signal lights indicating a change in direction, brake lights and tail lights showing the vehicle to following drivers are mounted on the tail or rear of a vehicle. These lights on the tail warn the following drivers of a change in the direction or speed of the front vehicle in order to prevent collision.

Of these lights, the brake lights are illuminated when a driver steps on a brake pedal to stop a vehicle. Specifically, when the driver steps on the brake pedal, a brake light switch mounted on the brake pedal activates the brake lights by detecting the operation of the brake pedal. The brake lights are especially important for safe driving since they serve to warn the following drivers when the brakes are applied. The brake lights also require rapid response since they are frequently operated in a running vehicle.

In order to activate the brake lights, a brake light switch and a brake pedal are provided to cooperate with each other.

Referring to FIGS. 1 and 2, a conventional brake light switch 1 is mounted on a pedal frame 4. The brake light switch 1 includes a switch body 5, a switch rod 6 mounted on the switch body 5 so as to be linearly movable, with a distal end thereof coming into contact with a brake pedal 2, and a nut 7 mounted on the pedal frame 4, for allowing to adjust the length of the switch rod 6.

The brake light switch 1 is attached to the brake pedal 2 with an interval d from 1 to 2 mm.

In the conventional brake light switch, however, the interval d is frequently changed by the operation of the brake pedal 2 and the vibration of a vehicle. When the interval d is reduced, hydraulic pressure enhanced by a brake booster 3 causes to turn on the brake lights before the switch rod 6 protrudes by a sufficient length. When the interval d is increased, the switch rod 6 excessively protrudes to turn on the brake lights all the time, thereby discharging a battery.

In the conventional brake light switch 1 as described above, the nut 7 is unfastened by a tool and then fastened again after the length of the switch rod 6 is adjusted in order to assemble the brake switch 1 to the pedal frame 4. As drawbacks, assembling works are troublesome and working time increases, thereby lowering working efficiency.

Furthermore, the nut 7 is loosened due to vibration and the like as time passes, so that the brake light switch cannot properly operate.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an automotive brake light switch, in which a switch rod protrudes by a constant length, and which cooperates with an air intake valve of a brake booster, such that brake lights can be activated at a correct time when hydraulic pressure is created by the brake booster.

In various aspects of the present invention, an automotive brake light switch apparatus mounted on a brake booster, which includes a housing defining therein a constant pressure chamber and a variable pressure chamber partitioned by a diaphragm, with a first through-hole formed in the housing so as to fluid-communicate the outside and the variable pressure chamber, a second through-hole formed in the diaphragm so as to fluid-communicate the variable pressure chamber and the constant pressure chamber, and an air intake valve having a vacuum channel therein to allow the constant pressure chamber to selectively communicate with the variable pressure chamber, wherein the air intake valve is fitted into the second through-hole of the diaphragm and is configured to selectively open or close the first through-hole of the housing in response to operation of a brake pedal, the brake light switch apparatus may include a switch body including a switch, a switch rod slidably mounted to the switch body so as to turn on/off the switch of the switch body, wherein a protruding length of the switch rod is changeable by operation of the air intake valve, and a coupling portion formed on the switch body and coupling the switch body to the housing through the first through-hole.

The coupling portion is configured to adjust a gap distance formed between the coupling portion and the air intake valve.

The air intake valve may include a cylinder and a body slidably coupled to the cylinder, and a leading end of the switch rod is configured to come into contact with a leading end of the body of the air intake valve, the switch rode being elastically biased toward the air intake valve, wherein the coupling portion of the brake light switch is configured to adjust a gap distance formed between the leading end of the coupling portion and the leading end of the air intake valve.

The coupling portion may define an outer channel for allowing the air intake valve to fluid-communicate with the outside, wherein the outer channel of the coupling portion includes at least a planar portion formed on outer circumference of the coupling portion along a longitudinal direction thereof.

The outer channel of the coupling portion may be shaped of a groove formed along a longitudinal direction thereof.

The outer channel of the coupling portion may be shaped of a hole passage formed through the coupling portion along a longitudinal direction thereof.

The outer channel of the coupling portion may be formed through a bracket fixed to the housing and surrounding the first through-hole, wherein the bracket has at least an air channel extending therethrough so as to fluid-communicate the outside and the first through-hole.

The coupling portion may have threads formed on an outer circumference portion thereof.

The housing may have a bracket protruding from a predetermined portion thereof surrounding the first through-hole, wherein the bracket may have threads formed on an inner circumferential portion thereof to receive the coupling portion therein and wherein the bracket may have at least an air channel extending therethrough so as to fluid-communicate the outside and the first through-hole.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
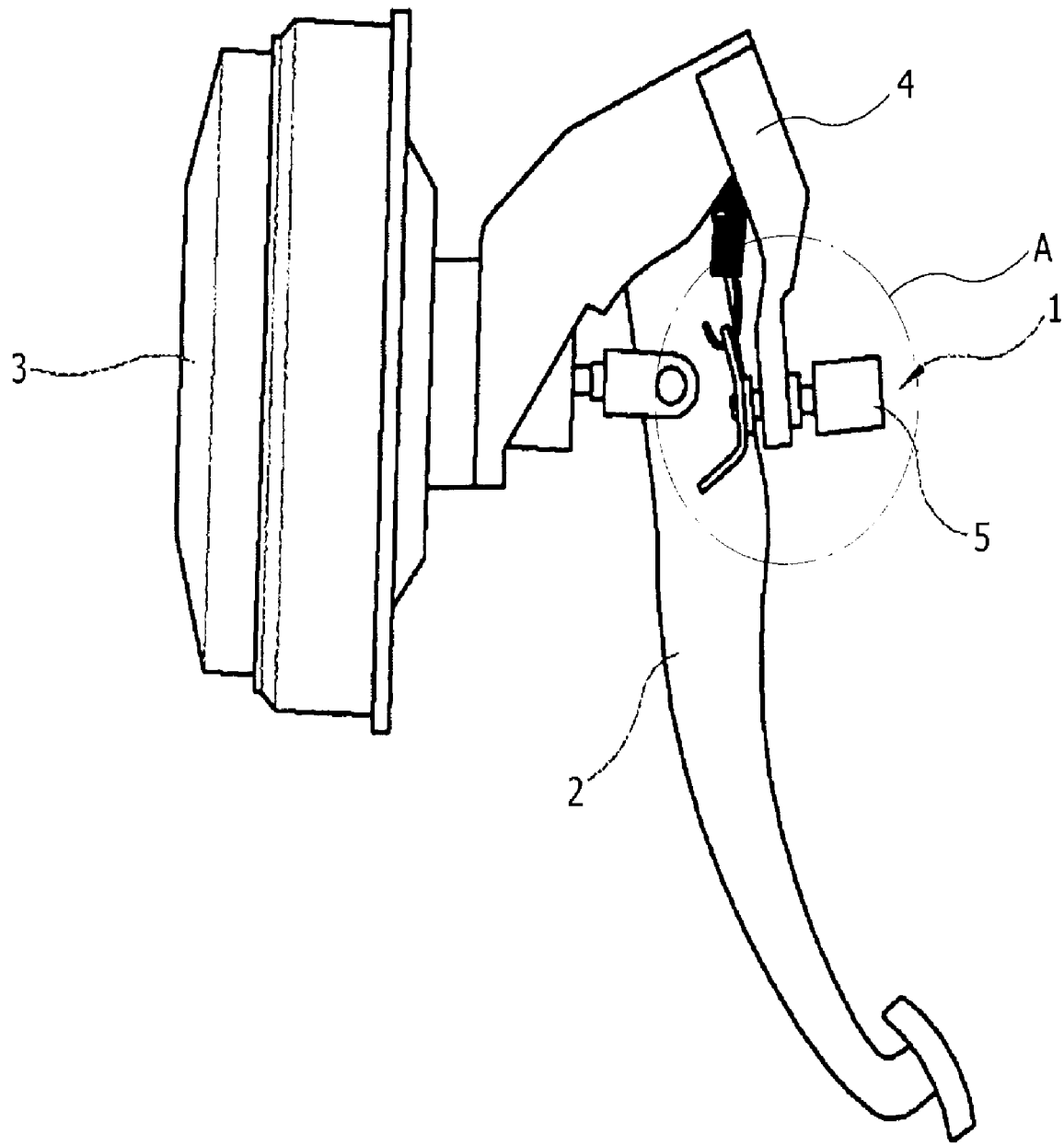
FIG. 1 illustrates a mounting structure of a conventional automotive brake light switch.
Figure 2:
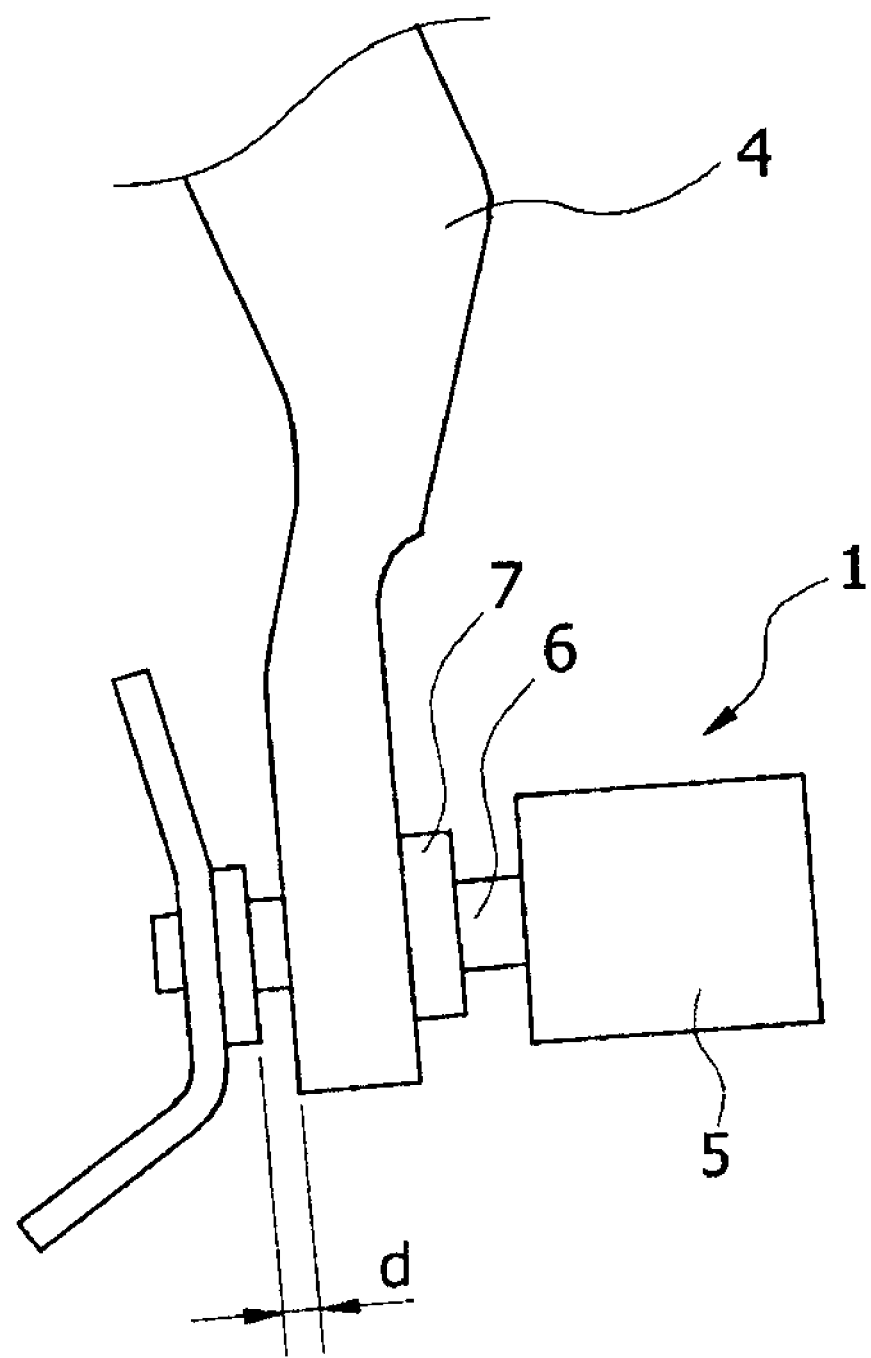
FIG. 2 is an enlarged view of the automotive brake light switch shown in FIG. 1.
Figure 3:
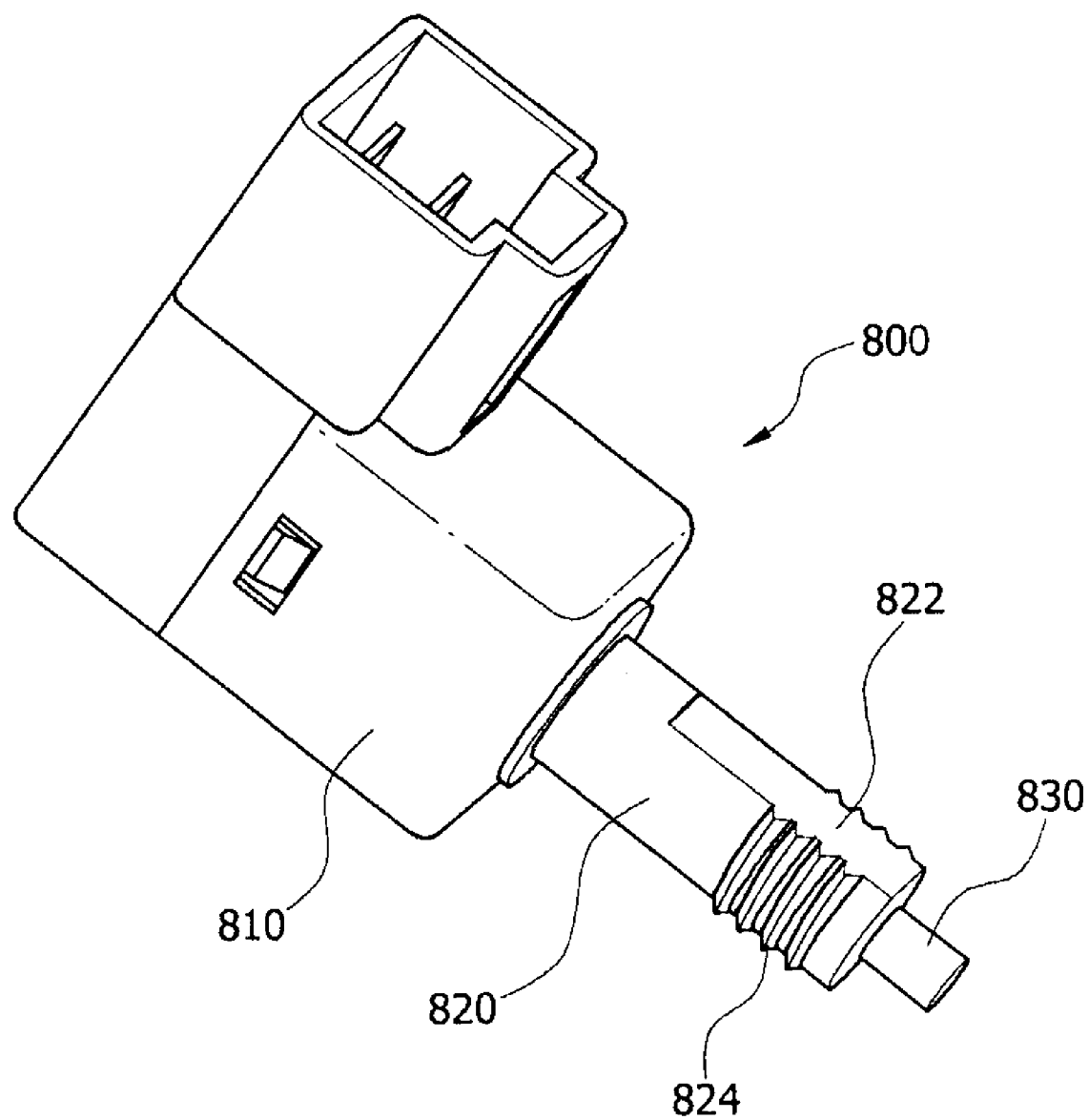
FIG. 3 is a perspective view of an exemplary automotive brake light switch according to the present invention.
Figure 4:
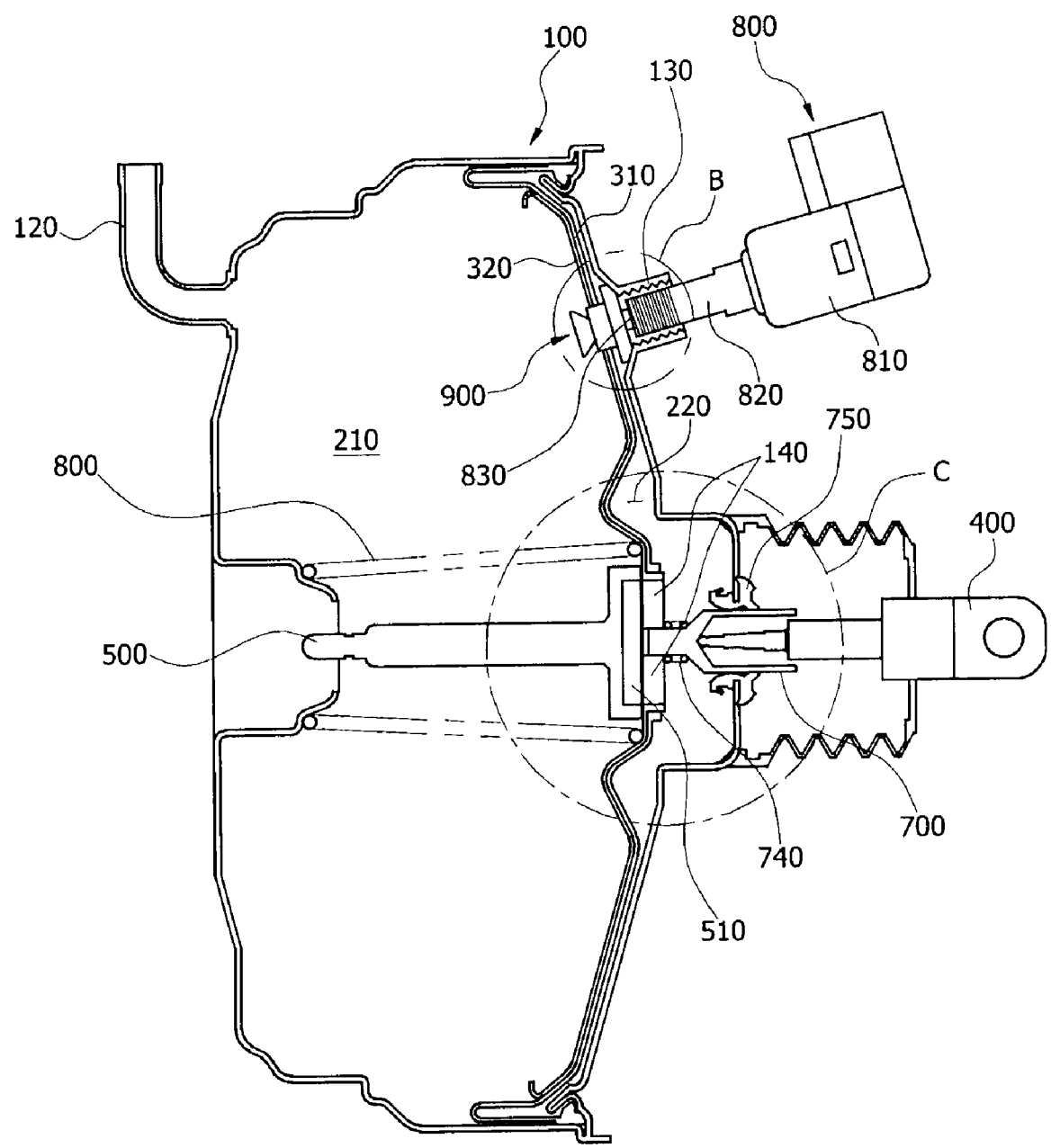
FIG. 4 is a cross-sectional view of a brake booster and the automotive brake light switch of FIG. 3 mounted on the brake booster.
Figure 5:
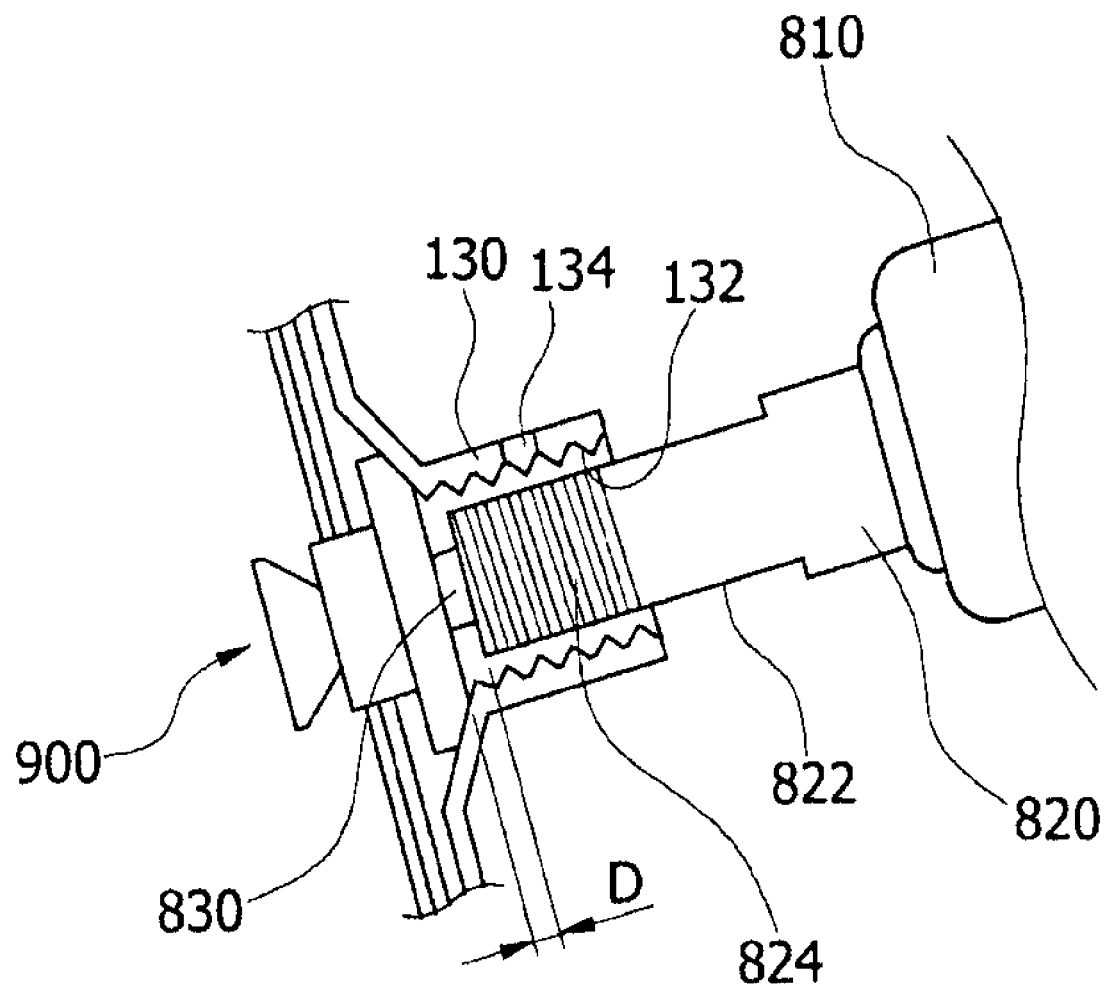
FIG. 5 is an enlarged view of part B of FIG. 4.

In the accompanying drawings, FIG. 3 is a perspective view of an automotive brake light switch according to various embodiments of the present invention, FIG. 4 is a cross-sectional view of an automotive brake light switch according to various embodiments of the present invention, in which the automotive brake light switch of FIG. 3 is mounted on a brake booster; and FIG. 5 is an enlarged view of part B of FIG. 4.

Referring to FIG. 3, the automotive brake light switch 800 according to various embodiments of the present invention includes a switch body 810 defining a housing, a coupling portion 820 mounting the brake light switch 800 to a vehicle and a switch rod 830 protruding from the switch body 810 to detect the operation of a brake.

The switch rod 830 is slidably mounted on the switch body 810 and is forced by an elastic member such as a spring provided on the proximal or rear end thereof, so as to protrude outwards. Thus, the switch rod 830 remains in a position that is most protruded from the switch body 810 and the coupling portion 820 when an external force is not applied thereto, but retracts into the switch body 810 when an external force greater than the elastic force of the elastic member provided on the proximal end of the switch rod 830 pushes the switch rod 830 towards the switch body 810 of the brake light switch 800.

The switch rod 830 slides with respect to the switch body 810 such that the brake light switch 800 is turned on or off according to the protruding length of the switch rod 830. The brake light switch 800 is generally turned off, but is turned on when the switch rod 830 protrudes for a predetermined length or more.

The coupling portion 820 functions to fix the switch body 810 to the vehicle as well as defining a sliding path for the switch rod 830. Threads 824 are formed on the outer circumference of the coupling portion 820, particularly, on a predetermined portion of the outer circumference of the coupling portion 820. A planar portion 822 is formed on another portion of the outer circumference of the coupling portion 820, on which the threads 824 are not formed, so as to be used as a channel for outer air, which will be described later.

Referring to FIG. 4, the automotive brake light switch 800 according to various embodiments of the present invention is mounted on a brake booster housing 100. This differs from the conventional brake light switch that is mounted on a brake pedal.

A brake booster is an apparatus that amplifies braking force applied to an input side using a pressure difference between the pressure of vacuum and atmospheric pressure and then transfers the amplified braking force to an output side.

As shown in FIG. 4, the brake booster generally includes the brake booster housing 100 on which the brake light switch 800 of various embodiments is mounted, an input shaft 400 receiving braking force generated by the operation of the brake pedal and an output shaft 500 transferring the braking force amplified by the operation of the input shaft 400 to a master cylinder.

The housing 100 defines therein a constant pressure chamber 210 and a variable pressure chamber 220, which are partitioned by a diaphragm 310. The constant pressure chamber 210 and the variable pressure chamber 220 communicate with each other through a vacuum channel defined in an air intake valve 900, which will be described later. A power piston 320, which receives a force caused by the pressure difference between the constant pressure chamber 210 and the variable pressure chamber 220, is provided in contact with the front surface of the diaphragm 310. A vacuum pipe 120 communicating with an intake system of an engine of a vehicle is provided on the outer wall of the constant pressure chamber 210. A return spring 800 is provided inside the constant pressure chamber 210 such that the diaphragm 310 and the power piston 320 can return to the original position by the elastic restoring force of the return spring 800 when the brake is not operated.

A stem 140 having a through-hole in the central portion thereof is coupled to the central portions of the diaphragm 310 and the power piston 320. Accordingly, when the stem 140 is pushed in one direction, both the diaphragm 310 and the power piston 320 connected to the stem 140 move along with the stem 140.

A plunger 700 is connected to the leading end of the input shaft 400 to transfer the braking force applied to the input shaft 400 to the output shaft 500, and a reaction disc 510 made of an elastic material is provided between the plunger 700 and the output shaft 500. A gap exits between the plunger 700 and the reaction disc 510.

The leading end of the plunger 700 is slidably inserted into the through-hole of the stem 140, which is placed in the central portion of the diaphragm 310. With this construction, the stem 140 is completely sealed by the plunger 700 to cut off the flow of air from the constant pressure chamber 210 into the variable pressure chamber 220 and vice versa.

The rear end of the plunger 700 protrudes from the housing 100, and a seal 750 is provided on a predetermined portion of the plunger 700, which adjoins the housing 100, so as to prevent air from entering the variable pressure chamber 220 even when the plunger 700 is moving.

A return spring 740 configured as a compressed coil spring is installed between the plunger 700 and the stem 140 in order to return the plunger 700 to the original position.

A series of through-holes (including a through-hole 110) sequentially extend through the housing 100, the diaphragm 310 and the power piston 320. An integral air intake valve 900 is fixedly fitted into the through-hole 110, for controlling the flow of air entering the constant pressure chamber 210 from the variable pressure chamber 220 and the flow of air entering the variable pressure chamber 220 from outside. The air intake valve 900 of various embodiments includes a component adjusting the protruding length of the switch rod 830 of the brake light switch 800. The air intake valve 900 includes a hollow cylinder 960, a body 910 extending through and slidably coupled with the cylinder 960 and a spring 970 interposed between the body 910 and the cylinder 960. The cylinder 960 can be configured as a variety of shapes such as a circular column and a square column, preferably, as a circular column for the sake of assembly. An interval is formed between the inner wall of the cylinder 960 and the body 910 placed inside the cylinder 960. This interval serves as a vacuum channel allowing the constant pressure chamber 210 and the variable pressure chamber 220 to communicate with each other such that air can flow from the variable pressure chamber 220 to the constant pressure chamber 210.

The through-hole 110 in the housing 100 is defined by a conical portion of the housing 100 that protrudes outwards, and a leading end portion 920 of the body 910 of the air intake valve 900 has a conical shape corresponding to that of the through-hole 110 in the housing 100. With this construction, when the body 910 of the air intake valve 900 is in close contact with the through-hole 110 in the housing 100, outer air does not enter the variable pressure chamber 220. In addition, a magnet 930 is attached to the outer surface of the leading end portion 920 of the body 910 of the air intake valve 900, such that the body 910 can be attracted by a magnetic force to the housing 100, which is made of steel.

A rear end portion 940 of the body 910 of the air intake valve 900 is shaped to catch the cylinder 960 such that the body 910 is not separated from the cylinder 960 when the cylinder 960 moves along with the diaphragm 310. The rear end portion 940 can be configured with a stepped or tapered cross section, which can be modified into various shapes.

In addition, female threads are formed in the through-holes of the diaphragm 310 and the power piston 320 and male threads are formed on the outer circumference of the cylinder 960, such that the air intake valve 900 can be easily fitted into the diaphragm 310. With this construction, the constant pressure chamber 210 can be kept airtight from the outside.

A bracket 130 having a circular cross section protrudes from a portion of the housing 100 surrounding the through-hole 110. The bracket 130 has female threads 132 on the inner circumference thereof, for engaging with the coupling portion 820 of the brake light switch 800.

When the brake light switch 800 is mounted on and fixed to the housing 100 through the engagement between the bracket 130 and the coupling portion 820, the leading end of the switch rod 830 is in contact with the leading end portion 920 of the air intake valve 900. Thus, when the switch rod 830 is pressed by the leading end portion 920 of the air intake valve 900, it retracts into the switch body 810, thereby leaving an interval D between the leading end portion 920 of the air intake valve 900 and the coupling portion 820 of the brake light switch 800.

In addition, in various embodiments of the present invention, since the threads 824 are formed on a predetermined portion of the outer circumference of the coupling portion 820 and the planar portion 822 is formed on another portion of the outer circumference of the coupling portion 820 on which the threads 824 are not formed, a channel for outer air is formed between the inner wall of the bracket 130 and the coupling portion 820 when the brake light switch 800 is mounted on and fixed to the housing 100 through the engagement between the coupling portion 820 and the bracket 130. The channel for outer air serves as a passage along which air from outside the brake booster enters the variable pressure chamber 220 through the air intake valve 900.

In various embodiments of the present invention, the channel for outer air may be shaped of a groove or a hole formed along the longitudinal direction of the coupling portion.

In addition, an air channel 134 extends through the wall of the bracket 130 in order to facilitate the introduction of the outer air into the variable pressure chamber 220.

Below, the operation of the automotive brake light switch 800 of various embodiments of the present invention will be described with reference to FIGS. 6A through 6C and FIGS. 7A and 7B.

Figure 6A:
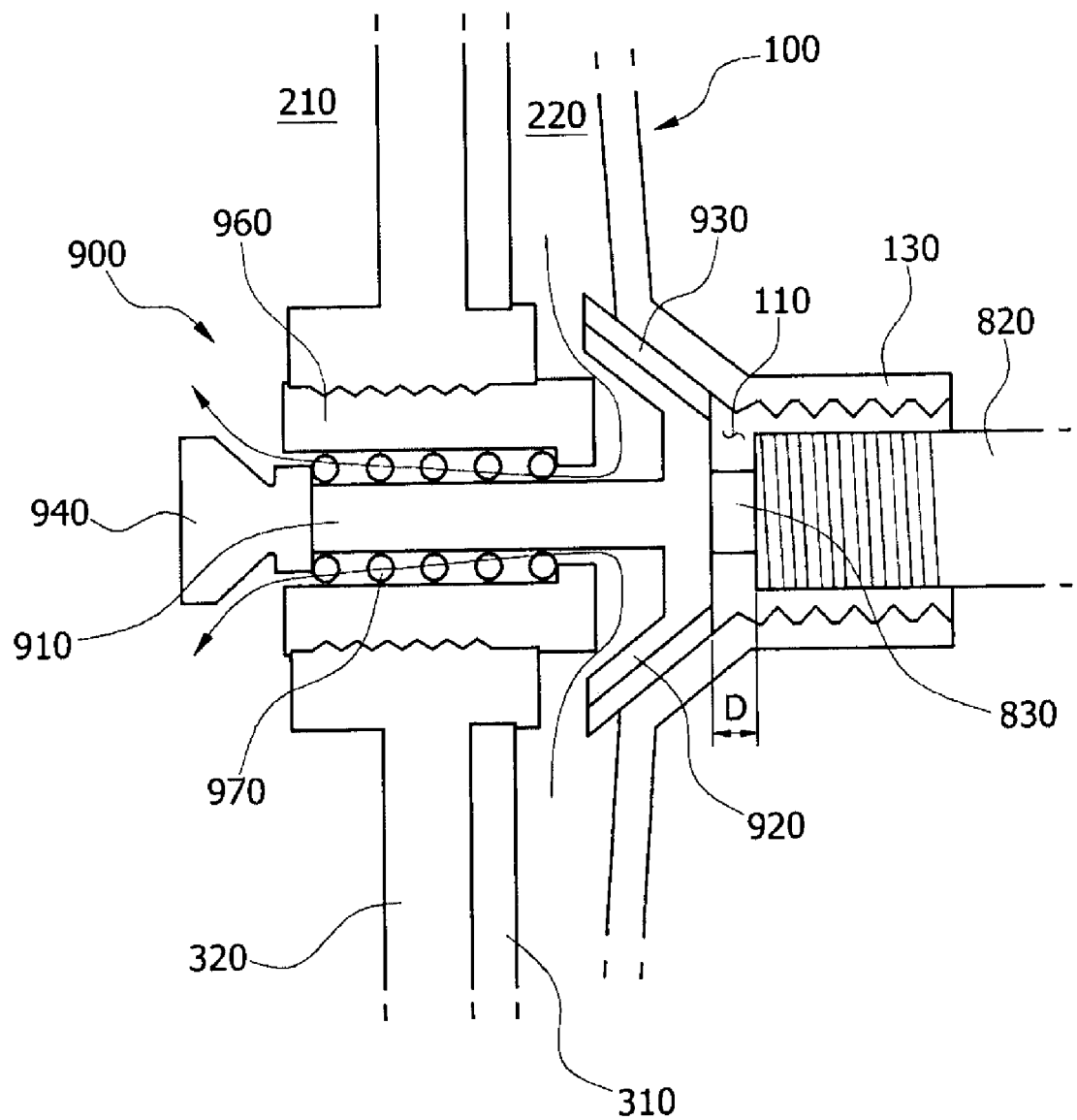
FIGS. 6A through 6C are enlarged views of part B of FIG. 4, sequentially showing the operation of the automotive brake light switch of FIG. 3.

As shown in FIG. 6A, in the state where the brake booster is not operated until a driver steps on the brake pedal, the leading end portion 920 of the body 910 of the air intake valve 900 is in contact with the inner surface of the housing 100. In this state, the protruding length of the switch rod 830, i.e., the interval D between the leading end portion 920 and the coupling portion 820 is the minimum.

In this state, the constant pressure chamber 210 is subjected to a negative pressure created by the intake system of the engine, and the negative pressure is transferred through the vacuum channel inside the cylinder 960 of the air intake valve 900 to the variable pressure chamber 220. Then, air is evacuated from the variable pressure chamber 220 through the air intake valve 900, the constant pressure chamber 210 and then the vacuum pipe 120. As a result, both the constant pressure chamber 210 and the variable pressure chamber 220 are under the negative pressure, and the diaphragm 310 is held in a stationary position by the elasticity of the return spring 800.

In this state, when the driver steps on the brake pedal, the input shaft 400 moves to push the plunger 700 towards the constant pressure chamber 210 such that the return spring 740 interposed between the plunger 700 and the stem 140 pushes the stem 140 towards the constant pressure chamber 210. In this case, the diaphragm 310 and the power piston 320 can move much farther than the plunger 700, which is pushed by the input shaft 400, since the modulus of elasticity of the return spring 970 provided inside the constant pressure chamber 210 is smaller than that of the return spring 740 provided on the leading end of the plunger 700.

Figure 6B:
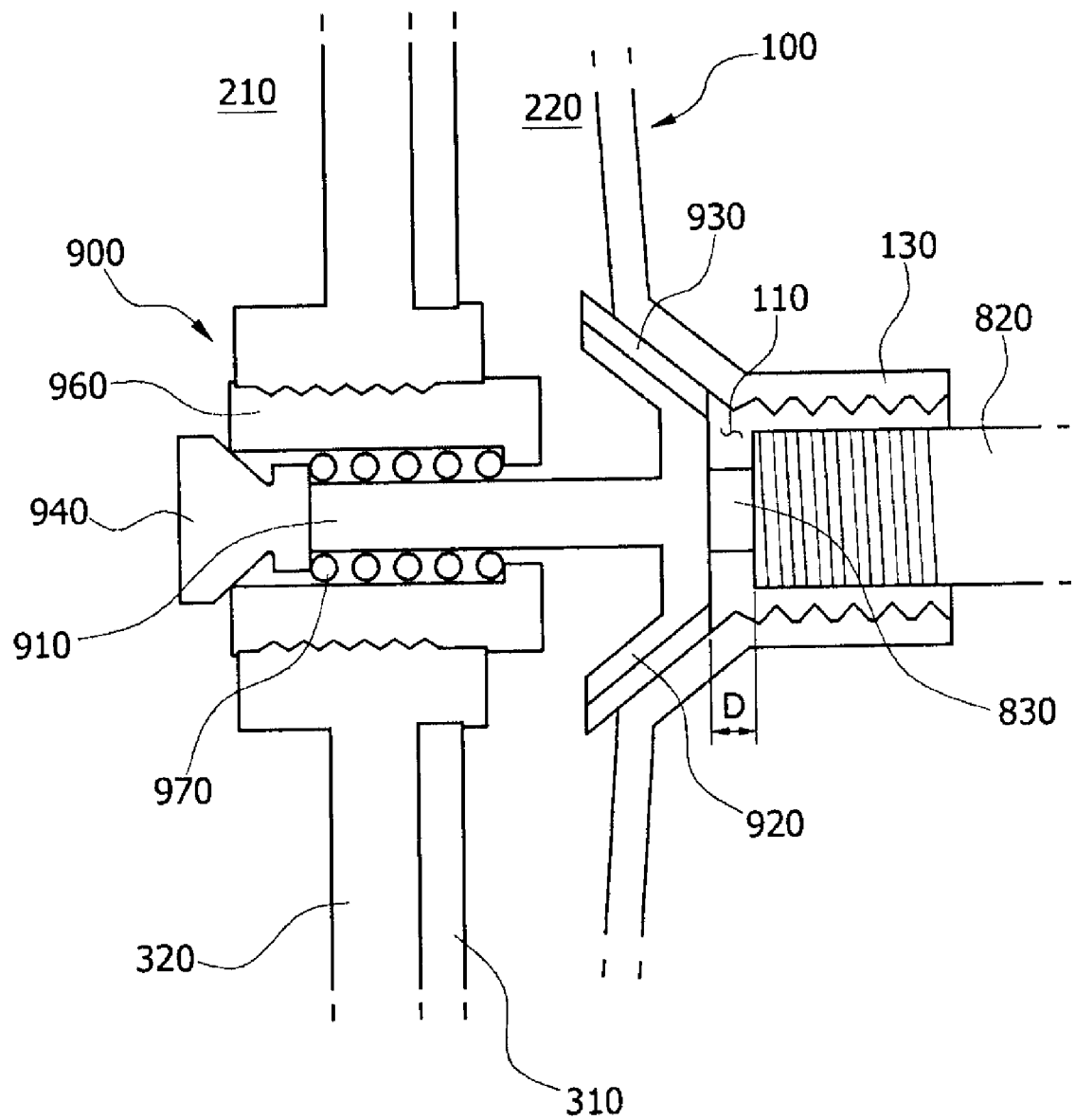

Then, the diaphragm 310 moves a little towards the constant pressure chamber 210, and the air intake valve 900 moves along with the diaphragm 310 which the intake valve 900 is coupled with. However, as shown in FIG. 6B, only the cylinder 960 moves along with the diaphragm 310 since the body 910 of the air intake valve 900 is held as attached to the housing 100 by the magnet 930, which is provided on the leading end portion 920. Accordingly, the protruding length D of the switch rod 830 is kept the same as before the brake pedal is stepped on.

Figure 7A:
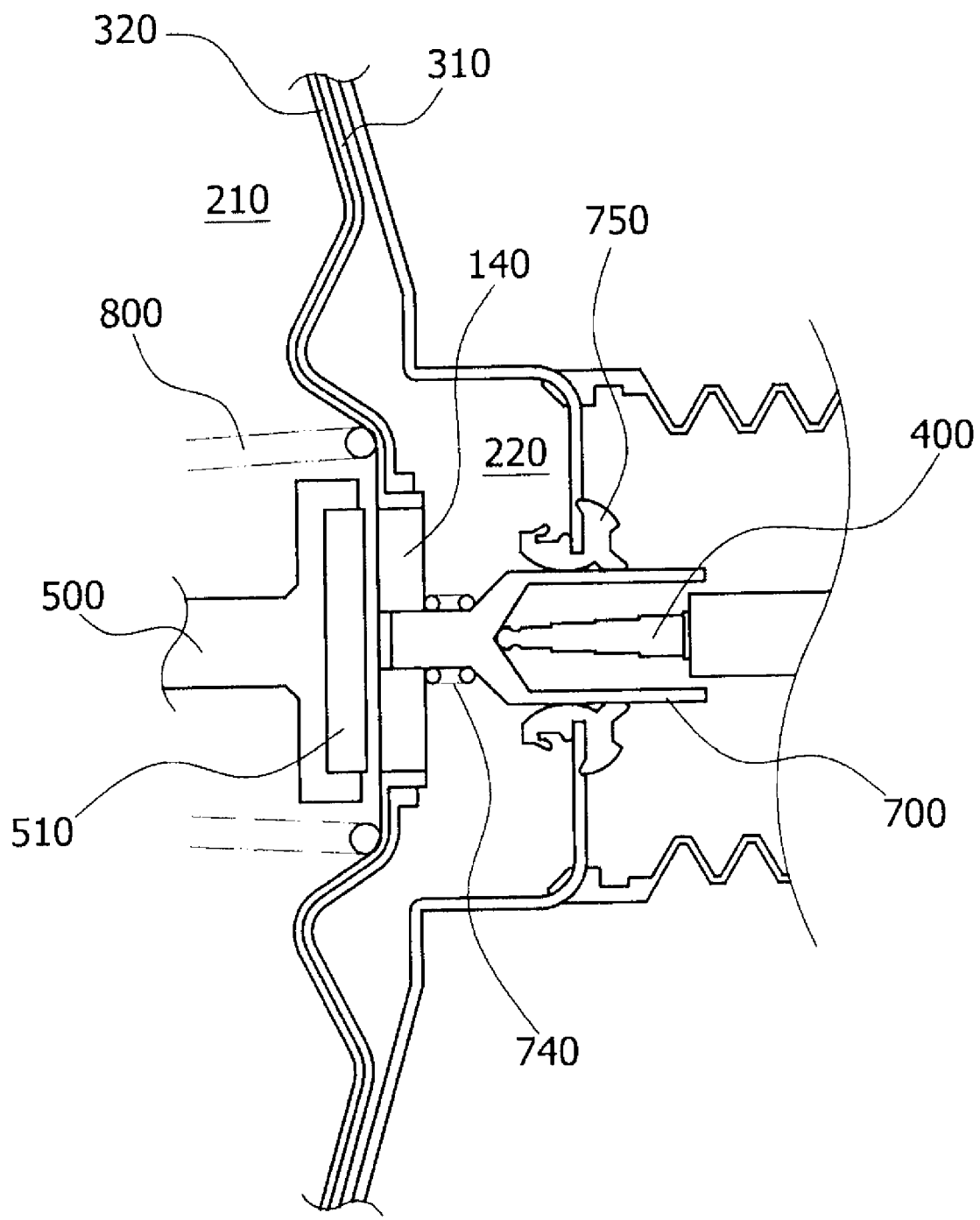
FIGS. 7A and 7B are enlarged views of part C of FIG. 4, sequentially showing the operation of the brake booster on which the exemplary automotive brake light switch of FIG. 3 is mounted.

When the cylinder 960, which is moved as described above, comes into close contact with the tapered rear end portion 940 of the body 910, the vacuum channel inside the air intake valve 900 is closed to thereby cut off the negative pressure applied to the variable pressure chamber 220. In this state, as shown in FIG. 7A, the stem 140 is spaced apart from the reaction disc 510 at a predetermined interval.

Figure 7B:
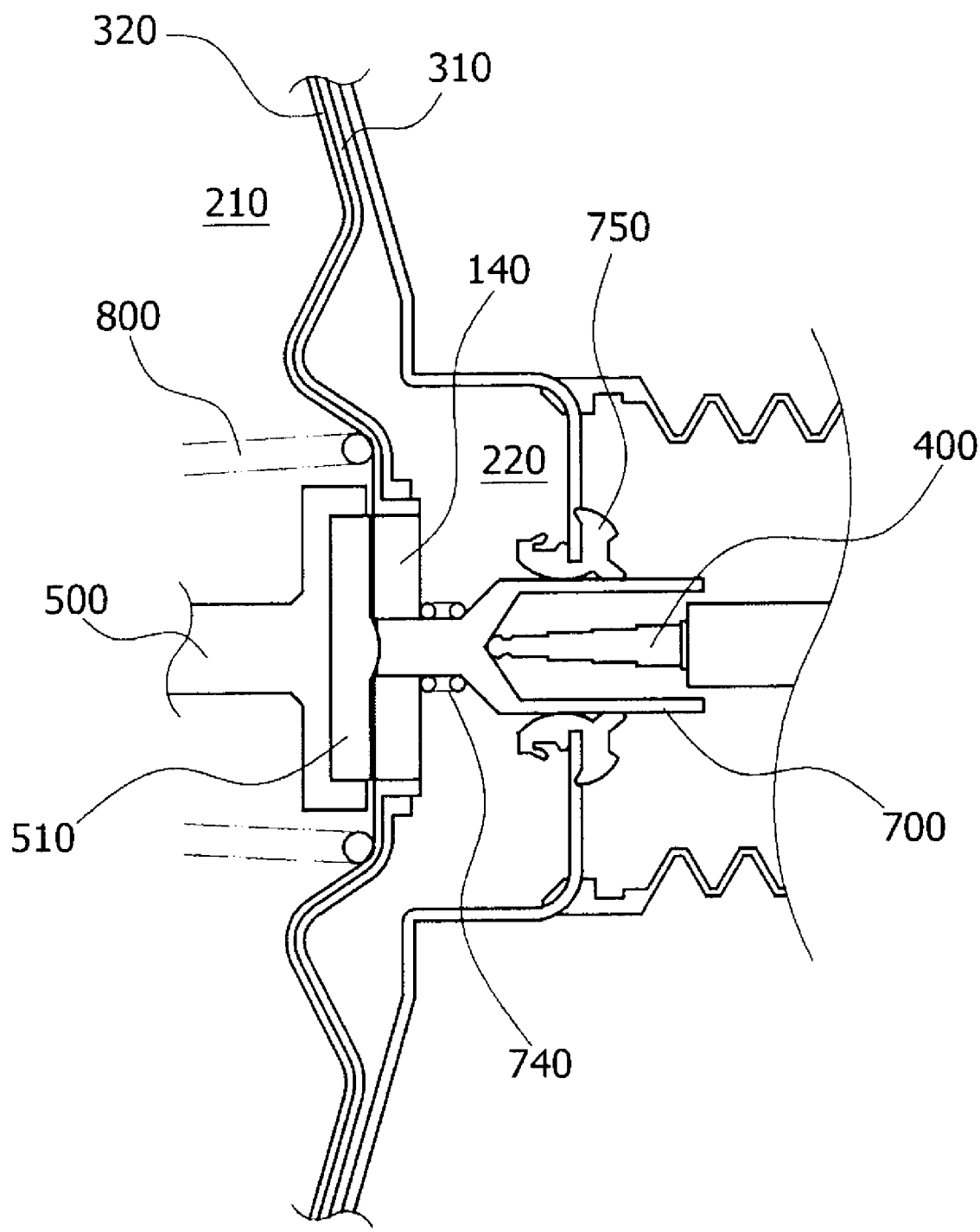

After that, when the input shaft 400 continues to push the plunger 700, the stem 140 is pushed continuously pressing the diaphragm 310 connected thereto. When the pushed stem 140 comes into contact with the reaction disc 510, the stem 140 presses the reaction disc 510 as shown in FIG. 7B. A portion of the reaction disc 510 adjoining the through-hole of the stem 140 bulges towards the through-hole of the stem 140 since it is not pressed by the stem 140. The cylinder 960 of the air intake valve 900 is pushed along with the diaphragm 310 and the power piston 320, which move integrally with the stem 140.

Figure 6C:
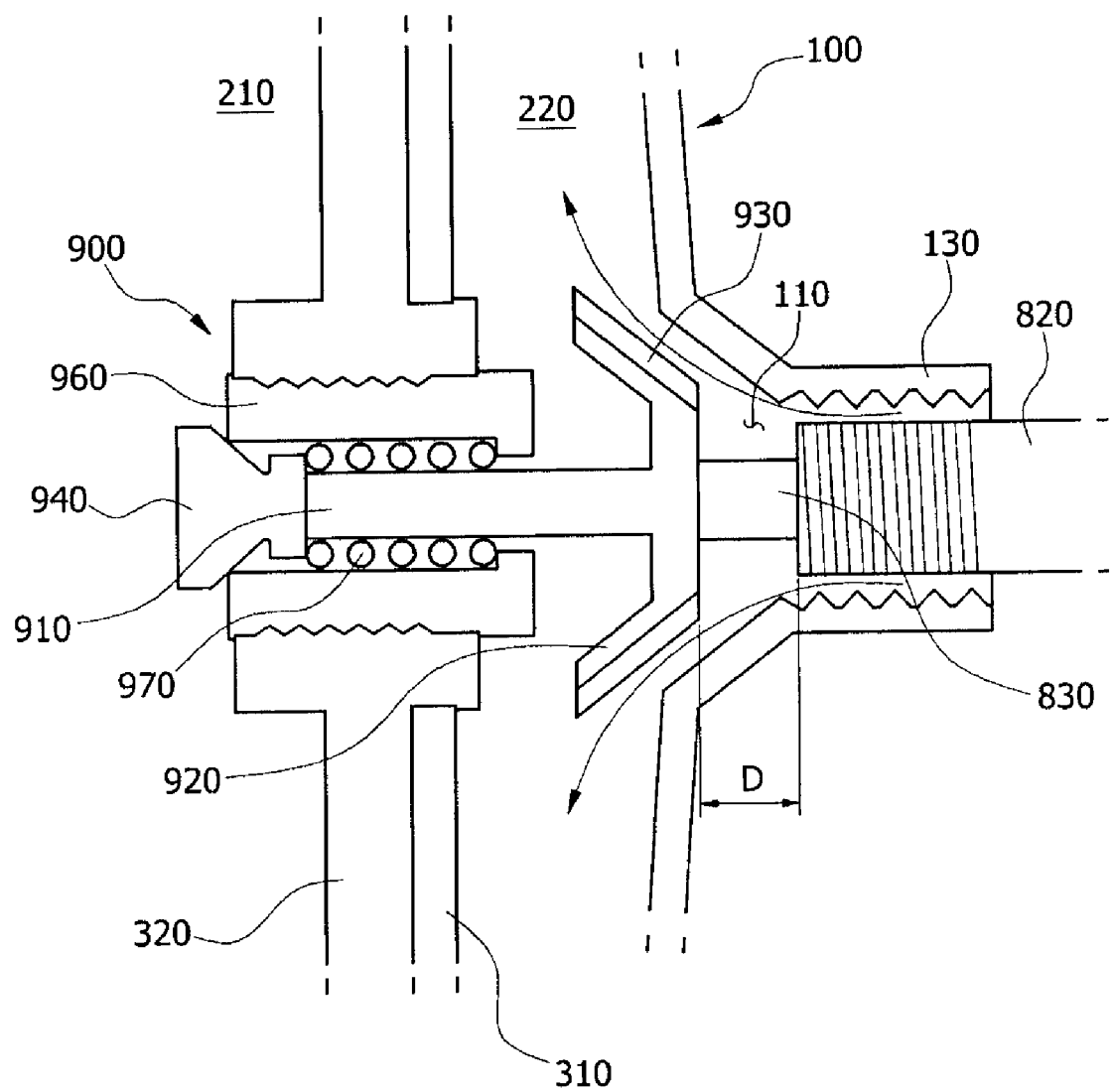

Here, one end of the cylinder 960 catches the tapered rear end portion 940 of the body 910 and thereby draws the body 910 towards the constant pressure chamber 210, so that the leading end of the body 910 is detached from the housing 100 as shown in FIG. 6C. At the moment when the leading end of the air intake valve 900 is detached from the housing 100, outer air quickly enters the variable pressure chamber 220, which is under the negative pressure. Then, the variable pressure chamber 220 is subjected to the atmospheric pressure.

When the variable pressure chamber 220 is under the atmospheric pressure, it has a pressure difference from the constant pressure chamber 210 under the negative pressure. Due to this pressure difference, the power piston 320 is pushed towards the constant pressure chamber 210. At this time, the stem 140 moves along with the power piston 320, to which the stem is connected, thereby pushing the input shaft 500.

When the protruding length D of the switch rod 830 becomes a predetermined length or more in response to the cylinder 960 moving following the power piston 320, the brake light switch 800 is switched on to activate the brake lights.

In this state, reaction force from the output shaft 500 is not transferred to the plunger 700 since the reaction disc 510 is not in direct contact with the plunger. As a result, braking force greatly increases without increasing input. This phenomenon is referred to as a jump-in effect, and the resultant output value is referred to as a jump-in value.

After that, when the reaction disc 510 start to touch the plunger 700, the reaction force from the output shaft 500 is transferred to the input shaft 400 to produce output in proportion to input.

The output boosted from the input through the above-described process is transferred to a master cylinder assembly through the output shaft to thereby generate braking hydraulic pressure.

When the driver steps off the brake pedal, the diaphragm 310 and the input shaft 400 return to the original position by the elastic restoring force of the return spring 800 and the power piston 320. The air intake valve 900 also retracts towards the housing 100, so that the body 910 of the air intake valve 900 is attached again to the through-hole 110 of the housing 100.

As a result, the switch rod 830 retracts again into the switch body 810 by the leading end portion of the air intake valve 900, the switch is turned off, and the brake lights are deactivated.

At the same time, the vacuum channel between the constant pressure chamber 210 and the variable pressure chamber 220 is open, so that air flows from the variable pressure chamber 220 through the vacuum channel into the constant pressure chamber 210, which is in vacuum, and from the constant pressure chamber 210 through the vacuum pipe 120 and a vacuum hose. As a result, the brake booster returns to the initial state.

For convenience in explanation and accurate definition in the appended claims, the terms "front", "rear", "inside", "outside", "outer" and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automotive brake light switch apparatus mounted on a brake booster, which includes a housing defining therein a constant pressure chamber and a variable pressure chamber partitioned by a diaphragm, with a first through-hole formed in the housing so as to fluid-communicate the outside and the variable pressure chamber, a second through-hole formed in the diaphragm so as to fluid-communicate the variable pressure chamber and the constant pressure chamber, and an air intake valve having a vacuum channel therein to allow the constant pressure chamber to selectively communicate with the variable pressure chamber, wherein the air intake valve is fitted into the second through-hole of the diaphragm and is configured to selectively open or close the first through-hole of the housing in response to operation of a brake pedal, the brake light switch apparatus comprising:
   a switch body including a switch;
   a switch rod slidably mounted to the switch body so as to turn on/off the switch of the switch body, wherein a protruding length of the switch rod is configured to be changeable by operation of the air intake valve; and
   a coupling portion formed on the switch body and coupling the switch body to the housing through the first through-hole.

2. The automotive brake light switch apparatus according to claim 1, wherein the coupling portion is configured to adjust a gap distance formed between the coupling portion and the air intake valve.

3. The automotive brake light switch apparatus according to claim 1, wherein the air intake valve includes a cylinder and a body slidably coupled to the cylinder, and a leading end of the switch rod is configured to come into contact with a leading end of the body of the air intake valve, the switch rode being elastically biased toward the air intake valve.

4. The automotive brake light switch apparatus according to claim 3, wherein the coupling portion is configured to adjust a gap distance formed between the leading end of the coupling portion and the leading end of the air intake valve.

5. The automotive brake light switch apparatus according to claim 1, wherein the coupling portion defines an outer channel for allowing the air intake valve to fluid-communicate with the outside.

6. The automotive brake light switch apparatus according to claim 5, wherein the outer channel of the coupling portion includes at least a planar portion formed on outer circumference of the coupling portion along a longitudinal direction thereof.

7. The automotive brake light switch apparatus according to claim 5, wherein the outer channel of the coupling portion is shaped of a groove formed along a longitudinal direction thereof.

8. The automotive brake light switch apparatus according to claim 5, wherein the outer channel of the coupling portion is shaped of a hole passage formed through the coupling portion along a longitudinal direction thereof.

9. The automotive brake light switch apparatus according to claim 5, wherein the outer channel of the coupling portion is formed a space formed between the coupling portion and a bracket fixed to the housing and surrounding the first through-hole.

10. The automotive brake light switch apparatus according to claim 9, wherein the bracket has at least an air channel so as to fluid-communicate the outside and the first through-hole therethrough.

11. The automotive brake light switch apparatus according to claim 9, wherein the coupling portion has threads formed on an outer circumference portion thereof.

12. The automotive brake light switch apparatus according to claim 1, wherein the housing has a bracket protruding from a predetermined portion thereof and surrounding the first through-hole.

13. The automotive brake light switch apparatus according to claim 12, wherein the bracket has threads formed on an inner circumferential portion thereof to receive the coupling portion therein.

14. The automotive brake light switch apparatus according to claim 12, wherein the bracket has at least an air channel so as to fluid-communicate the outside and the first through-hole therethrough.

15. A passenger vehicle comprising a brake booster having the automotive brake light switch apparatus according to claim 1.

* * * * *